US005561574A

United States Patent [19]

Engel et al.

[11] Patent Number: 5,561,574
[45] Date of Patent: Oct. 1, 1996

[54] METHOD FOR MANUFACTURING LIFTER FOR A DISC CARTRIDGE AND FEED STOCK THEREFOR

[75] Inventors: Roger K. Engel, Schaumburg; Karl K. Hoffman, Arlington Heights, both of Ill.

[73] Assignee: Plitek L.L.C., Des Plaines, Ill.

[21] Appl. No.: 521,614

[22] Filed: Aug. 31, 1995

Related U.S. Application Data

[63] Continuation of Ser. No. 223,112, Apr. 5, 1994, abandoned.

[51] Int. Cl.$^6$ .................................... G11B 23/03
[52] U.S. Cl. .................................... 360/133
[58] Field of Search ................................ 360/133

[56] References Cited

U.S. PATENT DOCUMENTS 4,639,967  2/1987  Bordignon .
4,672,499  6/1987  Oishi et al. .
4,750,075  6/1988  Oishi ........................................ 360/133
4,768,123  8/1983  Iizuka et al. .
5,326,608  7/1994  Ikebe et al. .
5,327,314  7/1994  Kikuchi et al. .

FOREIGN PATENT DOCUMENTS 61-278094  12/1986  Japan .

*Primary Examiner*—A. J. Heinz
*Attorney, Agent, or Firm*—Hill, Steadman & Simpson

[57] ABSTRACT

A feed stock for manufacturing lifters for disc cartridges, wherein the feed stock can be separated into individual lifters at an assembly station, the lifters to be applied inside the cartridge for pressing a cartridge liner against the disc at a location within the cartridge.

7 Claims, 3 Drawing Sheets

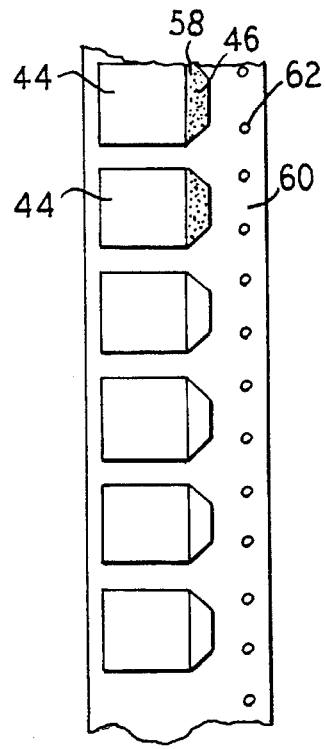
FIG. 5 (PRIOR ART)
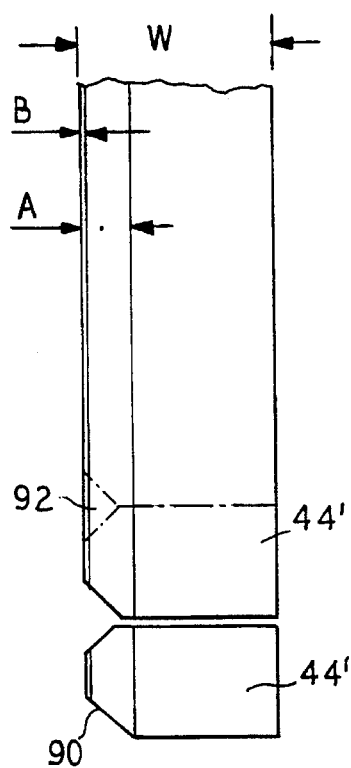
FIG. 7
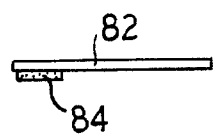
FIG. 9
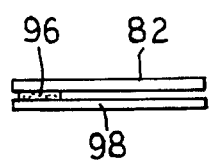
FIG. 10
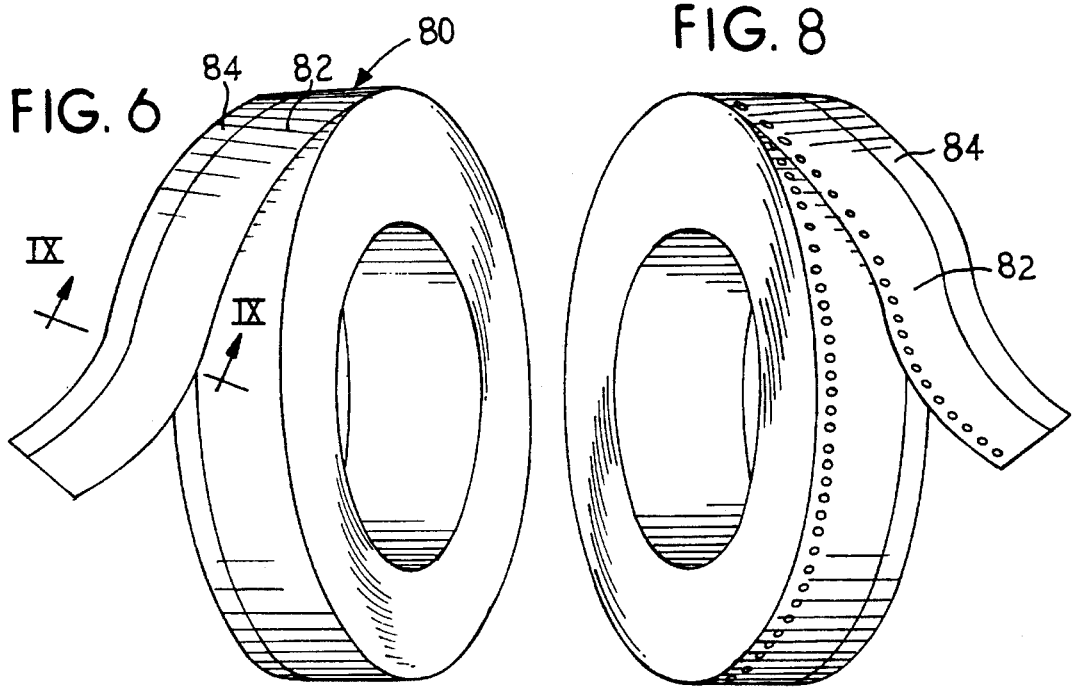
FIG. 6
FIG. 8

METHOD FOR MANUFACTURING LIFTER FOR A DISC CARTRIDGE AND FEED STOCK THEREFOR

This is a continuation of application Ser. No. 08/223,112, filed Apr. 5, 1994 now abandoned.

BACKGROUND OF THE INVENTION

The present invention relates to an article and a method for making the article, the article being a lifter element for use in a disc cartridge. Particularly, the invention provides a cost effective means of configuring and producing the lifter element.

Typically for hard-type magnetic disc cartridges, a hard case made of synthetic resin material contains a magnetic disc rotatably therein. The magnetic recording medium of the magnetic disc is thus protected from exposure to the outside, but through which an opening is provided to read information from the disc. In FIGS. 1–4, there is shown a conventional hard-type magnetic disc cartridge comprising a case which is composed of a cover member 1 and a bottom member 2, and a magnetic disc 3 which is rotatably contained in the hard case. The cover member 1 and the bottom member 2 are typically made of a synthetic resin material by molding.

On the inner surfaces of the cover member 1 and the bottom member 2, liners 4, 5 are attached on the opposite sides of both surfaces of the magnetic disc 3. The liners are made of a soft material. The case, composed of the cover member 1 and the bottom member 2, contains a space 6 having a height $H_1$ which is larger than a thickness $t_1$ of the magnetic disc 3.

The bottom member 2 is provided with a circular opening 21 in its center position along a pivot center 0, and an anti-abrasion chip 7 having a circular form is attached to the inner center of the cover member 1.

As shown in FIGS. 3 and 4, the cover member 1 and the bottom member 2 are further provided with windows 8, 9, respectively, one for each member, in their corresponding position through which the magnetic head may be inserted. The windows 8 and 9 are closed by shutters 10 when they are not used as shown in FIG. 1.

The magnetic disc 3 comprises a stepped hub portion 31 in its center, which is made of a metal or a synthetic resin material, and an annular ring, magnetic recording medium 32 which is coaxially connected to the periphery of the hub portion 31. The hub portion 31 is provided with an opening 33 in its center, through which the pivot shaft of the magnetic disc drive means is inserted. When the magnetic disc 3 is contained in the case, a circular ring projection 39 of the cover member 1 is positioned inside of the inner diameter part of the hub portion 31 of the magnetic disc 3 and the outer surface of the hub portion 31 is exposed to the central circular opening 21 of the bottom member 2 so that the magnetic recording medium 32 of the magnetic disc 3 may be completely covered by the cover member 1 and the bottom member 2 therebetween.

As shown in FIGS. 3 and 4, the upper case part 1 provides raised ribs 40 facing the lower cartridge part 2. The ribs 40 are arranged on the case side of the liner 4. On the lower part 2 is arranged a lifter 44 which is generally a thin piece of synthetic material anchored with adhesive 46 along one end thereof to the case 2 and wherein a rib 48 is applied to the case to flex a cantilevered portion 50 of the lifter 44 toward the liner 5. As shown in FIG. 2, when the upper cover 1 is connected to the lower part 2, the ribs 40 are opposed to the lifter 44 and the cantilever part 50 resiliently clamps the disc 32 between the liners 4, 5. This creates a wiping action as the disc 32 rotates through the region of the lifter 44 and the ribs 40 against the liners 4, 5. It is noted in FIGS. 3 and 4 that the liners 4, 5 are secured by adhesive or heat sealing 52 around their edges except the liner 4 is not heat sealed to the cover 1 in a region 54 to allow the liner for some flexibility to move under influence of the ribs 40 and the liner 5 is not adhesively secured to the lower part 2 in a region 56 to allow flexibility of movement under influence of the lifter 44.

It is known in the manufacture of lifters 44 to use an adhesive 46 in a lower region 58 of each lifter and to temporarily arrange a plurality of lifters 44 along a film strip 60 having tractor holes 62 applied thereon as shown in FIG. 5. The film strip 60 can be shipped in strips from the factory to the assembler of the cartridges.

SUMMARY OF THE INVENTION

It is an object of the present invention to provide a lifter for a disc cartridge which is readily manufactured and applied. It is an object to provide the lifter in a cost effective shipping state for installation by the cartridge assembler. It is an object of the present invention to provide a lifter which is readily installed. It is an object of the present invention to provide a lifter which during manufacture minimizes wasted materials. It is an object of the present invention to provide a readily manufactured and installed lifter for a 3.5 inch micro floppy disc.

The objects of the invention are achieved in that a lifter tape is provided having an adhesive region, using either a pressure sensitive or heat activated adhesive, along one edge thereof and the spring region extending therefrom, all in a wound tape medium. The tape medium can be readily shipped to a manufacturer of cartridges where simple cutting equipment can remove a plurality of lifters as the tape is unwound. The inventive tape can be applied in a left-handed wound or a right-handed wound embodiments. The present invention provides an improved method of manufacture and installation for a plastic lifter for a 3.5 inch micro floppy disc,

BRIEF DESCRIPTION OF THE DRAWINGS

FIG. 5 is a perspective view of a prior art method of retaining and shipping lifters;

FIG. 6 is a perspective view of a lifter tape according to the present invention;

FIG. 7 is a plan view of a section of lifter tape from FIG. 6;

FIG. 8 is a perspective view of an alternate embodiment of the lifter tape of FIG. 6;

FIG. 9 is a sectional view taken generally along line IX—IX of FIG. 6; and

FIG. 10 is an alternate embodiment of the tape of FIG. 9.

DETAILED DESCRIPTION OF THE PREFERRED EMBODIMENTS

Figure 1:
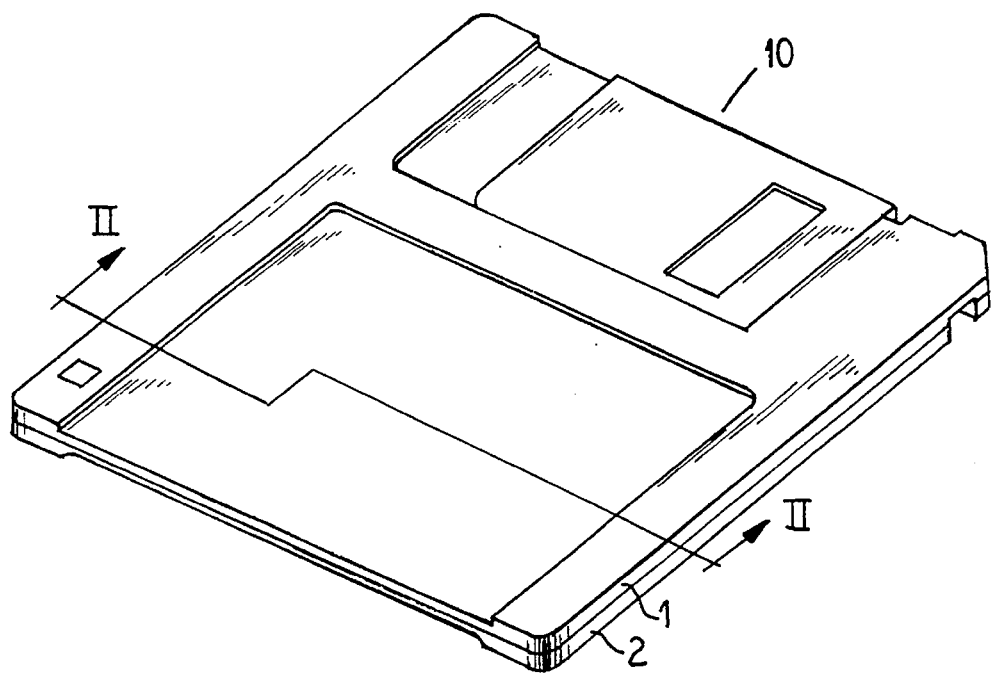
FIG. 1 is a perspective view of a prior art disc cartridge.
Figure 2:
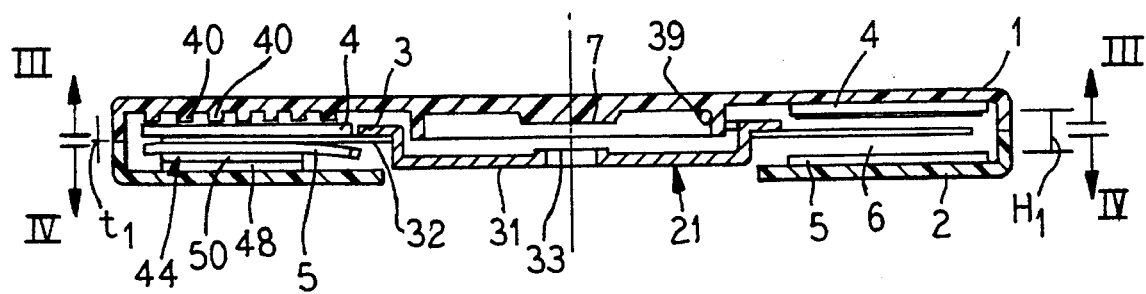
FIG. 2 is a sectional view of the disc cartridge of FIG. 1, taken generally along line II—II.
Figure 3:
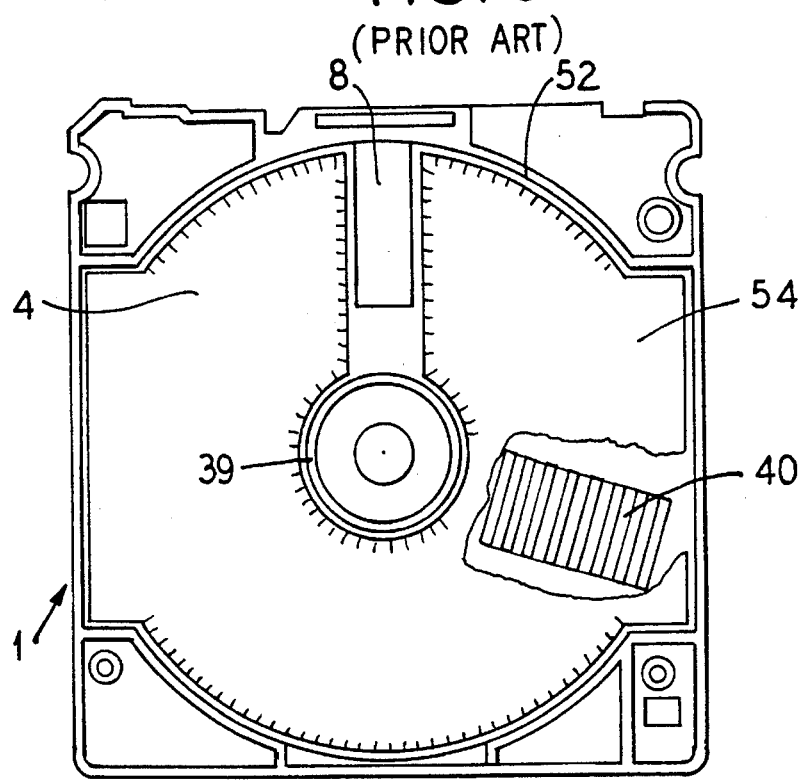
FIG. 3 is a sectional view of the disc cartridge of FIG. 2, taken generally along line III—III.
Figure 4:
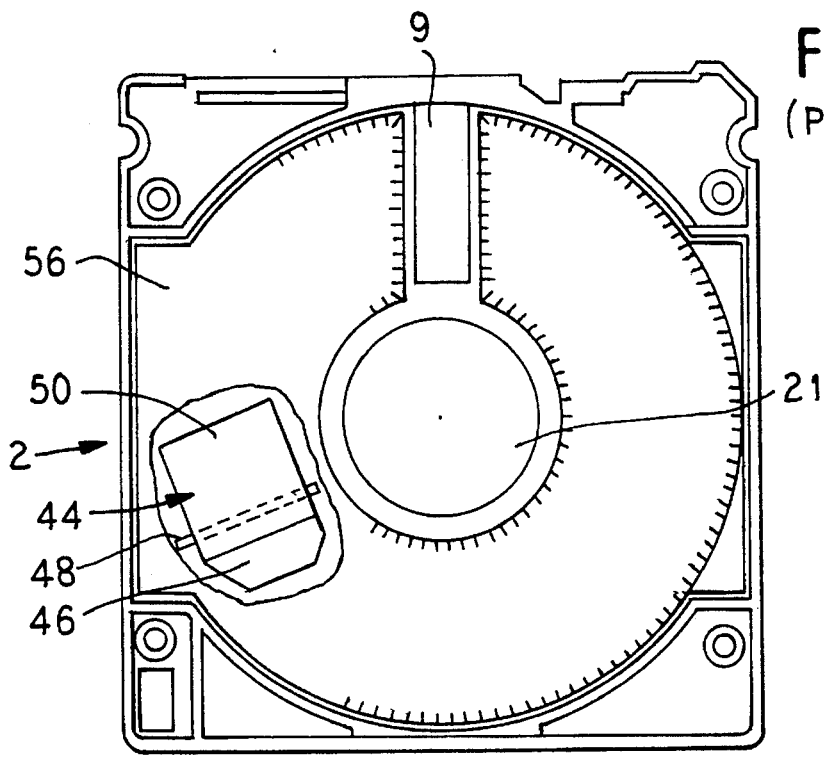
FIG. 4 is a sectional view of the disc cartridge of FIG. 2, taken generally along line IV—IV.

FIGS. 1–4 describe a prior art cartridge arrangement as discussed in the Background of the Invention. FIG. 5 describes a prior art method of retaining lifters for shipping and handling.

FIG. 6 illustrates a tape reel 80 for removing and manufacturing lifters 44'. These lifters 44' are shown for example for a 3.5 micro floppy disc. In the embodiment of FIG. 6, a tape is provided having a first layer 82 such as a 0.127 mm polymer plastic layer such as polyester, under which is applied along a left edge, a heat activated adhesive 84 preferably 0.025 mm wide.

According to FIG. 8,, the orientation of the adhesive 84 is reversed to be on a right side of the tape as unwound. Also, tractor holes 85 can be provided if needed for machine feeding and timing of cutting operations. Tractor holes can also be applied to the embodiment of FIG. 1.

FIG. 7 shows a section of the tape showing a width W, a border B and an adhesive width A for the tape. Preferably, the width W is 26.0mm ±0.3 or 27.0 mm ±0.3; the border is 0.5 mm ±0.5 and the adhesive region width A is 6.0 mm ±0.5. As shown, the lifters 44' can be cut off sequentially from the tape 80 without undue wasted materials. Where the lifter has beveled edges 90 in the adhesive region A, the resultant loss of material is approximately a small triangular area 92 between adjacent lifters 44'.

FIG. 10 shows an alternate embodiment wherein rather than a heat activated adhesive, a pressure sensitive adhesive 96 is utilized beneath the tape 82 and a release layer 98 is secured beneath the pressure sensitive adhesive 96. The entire assembly of tape 82, pressure sensitive adhesive 96 and release layer 98 can be rolled into the tape form as shown in either FIG. 6 or FIG. 8.

Although the present invention has been described with reference to a specific embodiment, those of skill in the art will recognize that changes may be made thereto without departing from the scope and spirit of the invention as set forth in the appended claims.

We claim:

1. A method for manufacturing lifters for disc cartridges, the lifters for lifting a liner from a case wall of the cartridge toward the disc held therein, comprising the steps of:

providing an elongate strip of plastic film;

applying an adhesive to said elongate strip of film on only one edge region thereof, said adhesive applied in a continuous line along said edge region;

winding said elongate strip of film into a roll;

unwinding said roll and cutting a plurality of lifters therefrom, each lifter including a portion of the edge region said lifters cut along common edges between adjacent lifters to minimize scrap material;

applying individual lifters cut from said roll directly to said case wall of each of said cartridges and securing each of said lifters by contacting said adhesive on said portion of said edge region to said case wall.

2. The method according to claim 1, wherein said adhesive is a heat activated adhesive.

3. The method according to claim 1, wherein said adhesive comprises a pressure sensitive adhesive, and comprising the further step of before winding said film, applying a release layer covering said pressure sensitive adhesive.

4. A feed stock for manufacturing lifters for use in displacing liners from a cartridge wall in a disc cartridge, the liner displaced to make contact with said disc within said cartridge, each said lifter having an adhesive portion and a body portion for exerting spring force against said liner, comprising:

an elongate film strip having a continuous uninterrupted adhesive band applied lengthwise thereto, said film strip wound into a roll for shipping and handling and cutting into lifters at an assembly station.

5. The feed stock according to claim 4, wherein said film strip comprises polyester film.

6. The feed stock according to claim 4, wherein said adhesive comprises a heat activated adhesive.

7. The feed stock according to claim 4, wherein said adhesive comprises a pressure sensitive adhesive and said apparatus further comprises a release layer covering said pressure sensitive adhesive.

* * * * *